United States Patent [19]

De With

[11] Patent Number: 4,957,688
[45] Date of Patent: Sep. 18, 1990

[54] SYSTEM FOR THE TRANSMISSION OF VIDEO SIGNALS WITH ADAPTIVE CODE WORD ALLOCATION, AND ALSO A TRANSMITTER AND A RECEIVER SUITABLE FOR THE SYSTEM

[75] Inventor: Peter H. N. De With, Eindhoven, Netherlands

[73] Assignee: U.S. Philips Corporation, New York, N.Y.

[21] Appl. No.: 326,577

[22] Filed: Mar. 21, 1989

[30] Foreign Application Priority Data

Apr. 15, 1988 [NL] Netherlands ......................... 8800988

[51] Int. Cl.$^5$ .............................................. H04N 7/12
[52] U.S. Cl. .................................... 358/133; 358/135; 358/136

[58] Field of Search ................. 358/133, 13, 138, 135, 358/136; 325/27

[56] References Cited

U.S. PATENT DOCUMENTS 4,670,851 6/1987 Murakami et al. ............. 358/136 X
4,791,654 12/1988 De Marca et al. ............. 358/133 X Primary Examiner—James J. Groody
Assistant Examiner—Victor R. Kostak
Attorney, Agent, or Firm—Edward W. Goodman

[57] ABSTRACT

In a system for the transmission of video signals digitized by means of differential pulse code modulation, the constituent signal words are submitted to a variable-length coding operation. A further bit rate reduction is then realized in that the allocation of the code words to the signal words is periodically adapted to the local statistics of the video signal.

12 Claims, 3 Drawing Sheets

| I | II | III | I | II | III |
|---|---|---|---|---|---|
| a | 11110 | 01 | 11110 | a | e |
| b | 1110 | 001 | 1110 | b | f |
| c | 110 | 0001 | 110 | c | g |
| d | 10 | 00001 | 10 | d | h |
| e | 01 | 11110 | 01 | e | a |
| f | 001 | 1110 | 001 | f | b |
| g | 0001 | 110 | 0001 | g | c |
| h | 00001 | 10 | 00001 | h | d |

SYSTEM FOR THE TRANSMISSION OF VIDEO SIGNALS WITH ADAPTIVE CODE WORD ALLOCATION, AND ALSO A TRANSMITTER AND A RECEIVER SUITABLE FOR THE SYSTEM

A. BACKGROUND OF THE INVENTION

A.1. Field of the Invention

The invention relates in its generality to a system for the transmission of a video signal from a transmitter to a receiver, and more specifically to a system for the transmission of a video signal in a digitized form obtained by means of differential pulse-code modulation (DPCM), the composite signal words of the digitized video signal additionally being submitted to a variable-length coding operation.

The invention also relates to a transmitter and a receiver suitable for the system.

A.2. Description of the Prior Art

Digitizing analog information signals has of late received an increasing interest. Relative to analog signals, digital signals generally have the advantage that noise superimposed on them during the transmission can be removed. The bit rate of the digital signal is highly dependent on the type of analog signal; that is to say its bandwidth and the number of bits required to represent each sample of the analog signal so as to obtain a predetermined quality. Thus, a digitized TV-image needs approximately 5 Mbits, which corresponds to a bit rate of approximately 120 Mbit per second. For the majority of transmission media this bit rate is impermissibly high. For that reason a number of techniques have been developed to reduce this bit rate. These techniques have for their object to reduce either the number of bits per sample or the number of samples to be transmitted, or a combination of both techniques.

An example of a technique which reduces the number of samples to be transmitted is the transformation coding technique. Therein an image is divided into sub-images which are each considered to be a sum of a plurality of mutually orthogonal basic images, each having its own weight factor. Only a limited number of these weight factors are encoded for transmission to the receiver, for example only the weight factors having an absolute value which exceeds a threshold value. In this case the transmitted weight factors constitute the signal words mentioned in the foregoing.

A bit rate reduction technique which has for its object to reduce the number of bits per sample is the differential pulse code modulation (DPCM). Therein a prediction signal sample is always subtracted in the transmitter from a video signal sample to generate a differential signal sample which is quantized and encoded. The differential signal samples thus quantized and encoded represent the above-mentioned signal words. They are transmitted via a transmission medium to the receiver where they are converted into the original video signal samples by means of a circuit having integrating properties. The bit rate reduction is realized by the fact that the differential signal samples are generally distributed over a smaller dynamic range than the original video signal samples and consequently can be represented by a lower number of bits.

A known technique of realizing a further bit rate reduction for any digital signal consisting of signal words is the variable-length coding. Therein a variable-length coding book is defined and one code word from this coding book is assigned to each signal word. More specifically, a shorter code word is assigned to a signal word which statistically occurs often than to a signal word which statistically occurs less often. The structure of the variable-length coding book and the allocation depends on the type of signal. After transmission, the code words are reconverted into the original signal words.

Such a variable-length coding can be applied to the quantized and encoded difference signal samples obtained by differential pulse code modulation (see Pratt: Image Transmission Techniques, Academic Press, New York 1979, page 16).

B. OBJECT AND SUMMARY OF THE INVENTION

The invention has for its object to provide, in a system for the transmission of a video signal from a transmitter to a receiver in a digitized form obtained by means of differential pulse code modulation (DPCM), the transmitter including a differential pulse code modulator which produces an output signal consisting of signal words, the signal words additionally being submitted in a variable-length encoding circuit to a variable-length coding operation, to generate variable-length code words, and the receiver including a variable-length decoder circuit to convert the received variable-length code words into signal words of a fixed length which are in addition applied to a differential pulse code demodulator, a further bit rate reduction.

According to the invention, the variable-length encoding circuit comprises:

means for defining contiguous signal segments each consisting of a sequence of consecutive signal words;

means for defining for each signal segment a reference set consisting of a number of reference words which are related to a number of signal words which are predetermined relative to the signal segment and are correlated with the signal words of the signal segment;

means for determining a statistic quantity from the reference set thus formed and for generating a coding book signal under the control thereof;

means for selecting under the control of said coding book signal a coding book from a fixed set of coding books;

means for converting for each signal segment the signal words in accordance with the selected code book into variable-length code words; and that the variable-length decoder circuit in the receiver comprises:

means for generating for each received signal segment a decoder book signal from the received signal which corresponds to the coding book signal generated in the transmitter for the relevant signal segment;

means for selecting a decoder book from a fixed set of decoder books under the control of said decoder book signal;

means for converting for each received signal segment the variable-length code words in accordance with the selected decoder book into signal words.

In prior art circuits for performing variable-length coding, there is a fixed relation between the signal word to be encoded and the code word assigned thereto in accordance with the coding book, as, considered statistically, that signal word has a given chance of occurring in the relevant type of signal. The invention is the result of a further examination of the bit flow at the output of the variable-length encoder. From this examination it was found that it regularly occurred that sequences of signal words, denoted signal segments, after having been submitted to a variable-length coding, require more bits to be represented than when they are not submitted to variable-length coding. From this Applicants have drawn the conclusion that this must be due to the fact that of such a signal segment the statistics significantly deviate from the global statistics for this type of signal. The invention is now based on the general idea to determine the local statistic of the signal and to have the allocation of variable-length code words to the signal words dependent on this local statistic. The reference set mentioned in the foregoing is now used to determine the local statistic of the signal. More specifically, this set is examined to determine the amplitude distribution of the reference words forming the set. In dependence thereon, the code words of variable-length are assigned to the signal words. As mentioned in the foregoing, the reference words are related to signal words, that is to say that these reference words are constituted by the signal words themselves, by their non-encoded versions such as they are pesent in the DPCM-encoder, by their non-quantized versions such as they are also contained in the DPCM-encoder, or by video signal samples applied to the DPCM-encoder.

As regards the requirement that the signal words to which the reference words are related must be correlated with the signal words of the signal segment under consideration, it should be noted that this implies that they must be located in the immediate environment of the relevant signal sample. Namely, experiments have taught (see Pratt: Image Transmission Techniques, Academic Press, New York 1979) that video signal samples are generally highly locally correlated. A small block of video signal samples, for example, is highly correlated with the video signal samples surrounding it in the TV-image, while the correlation with video signal samples located further on is low. This also holds for differential signal samples.

C. SHORT DESCRIPTION OF THE FIGURES

D. DESCRIPTION OF THE INVENTION

Figure 1:
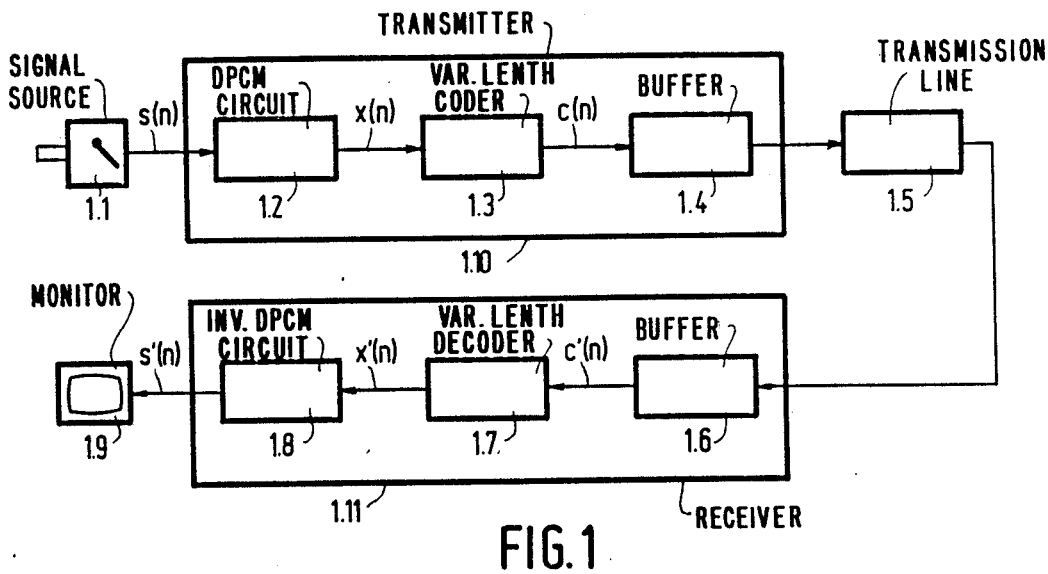
FIG. 1 is a schematic view of a transmission system for transmitting video signals by means of DPCM.

FIG. 1 shows schematically the general structure of a transmission system for transmitting video signals by means of differential pulse code modulation. The system includes a transmitter 1.10 and a receiver 1.11. The system is provided by a signal source 1.1, for example a video camera, with a digitized video signal formed from a sequence of fixed-length video signal samples $s(n)$ which occur at a frequency $f(s)$ denoted the sampling rate of the video signal. These samples $s(n)$ are applied to a DPCM circuit 1.2, in which they are converted into signal words $x(n)$ of a fixed length, denoted DPCM samples hereinafter. In their turn, these DPCM samples $x(n)$ are applied to a variable-length coder circuit 1.3. Therein they are converted into variable-length code words $c(n)$, denoted VLC-samples in the sequel. These VLC-samples $c(n)$ are applied to a buffer 1.4 before they are transmitted to a receiver via a transmission line 1.5. The buffer is necessary to obtain a predetermined fixed bit rate on the transmission line, in spite of the fact that the VLC-samples which occur at a predetermined fixed rhythm are formed of different numbers of bits. For similar reasons the receiver includes a buffer 1.6 which supplies VLC-samples $c'(n)$ which correspond to the VLC-samples $c(n)$ applied to the buffer 1.4 in the transmitter. These VLC-samples $c'(n)$ are converted in a variable-length decoder circuit 1.7 into DPCM-samples $x'(n)$ of a fixed length. Thereafter these DPCM-samples $x'(n)$ are applied to an inverse DPCM-circuit 1.8 which converts them into video signal samples $s'(n)$ which are also of a fixed length. These video signal samples $s'(n)$ correspond to the video signal samples $s(n)$ generated by the signal source 1.1. The receiver then applies these video signal samples to, for example, a monitor 1.9. It should here be noted that DPCM and inverse DPCM-circuits are generally known; see, for example, Pratt: Image Transmisstion Techniques, Academic Press New York 1979, FIG. 3.1.

VLC-circuits are known to their generality: see, for example, Pratt: Image Transmission Techniques, Academic Press, New York 1979, FIGS. 7.4 and 7.5. Usually they include a memory, for example a ROM, which receives by way of address a sample to be coded (in this case a DPCM-sample $x(n)$). Hereinafter it will be assumed that each DPCM-sample $x(n)$ is formed by 3 bits and consequently can assume one out of 8 amplitude values. These 8 amplitude values are numbered, monotonically increasing, a to h, inclusive. The ROM will then have 8 memory locations, each containing a VLC word, and which can each be addressed by a DPCM-sample. The content of the ROM is alternatively referred to as coding book.

The VLC-circuit 1.3 shown in the transmitter of FIG. 1 is now arranged for performing an adaptive variable-length coding. To achieve this, the ROM in this VLC-circuit 1.3 contains different coding books, one of which is selected at a predetermined instant. Which book depends on the local statistics of the video signal, i.e. the statistic distribution of the amplitude values of video signal samples or DPCM-samples located near the DPCM-sample to be encode, optionally including the DPCM-sample.

Figure 2:
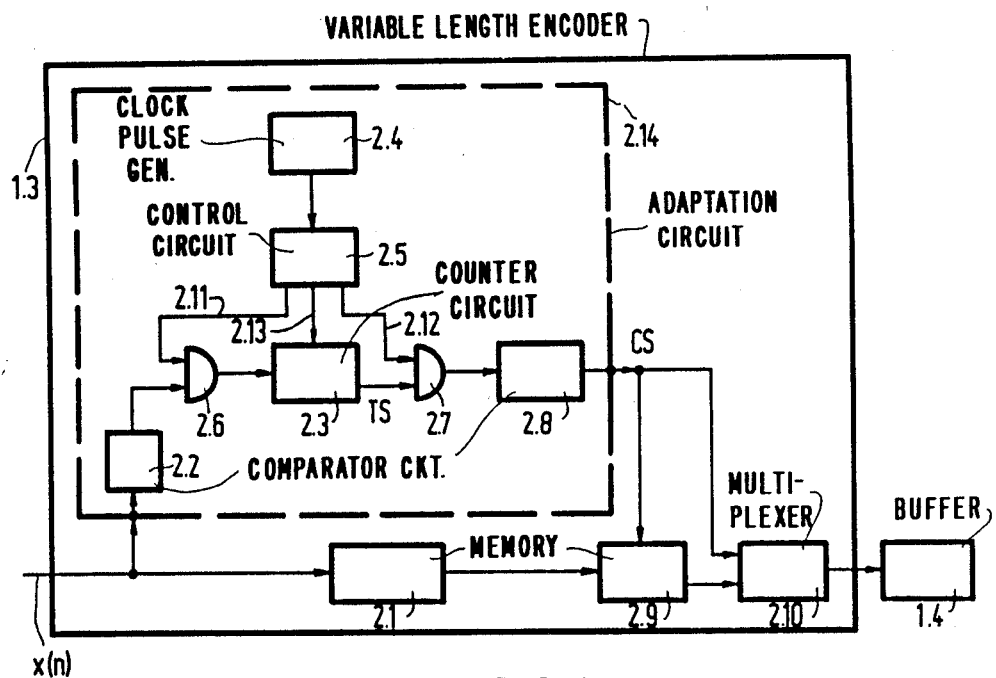
FIG. 2 shows an embodiment of a variable-length encoding circuit arranged for performing an adaptive variable-length coding.

An embodiment of such a VLC-circuit is shown in FIG. 2. A coding book is determined on the basis of the amplitude distribution of the DPCM-samples in a set of 16 consecutive DPCM-samples $x(n)$, including the sample to be encoded. This set now represents the reference set mentioned in the foregoing. It is more specifically checked how many of these 16 consecutive DPCM-samples of the reference set have an amplitude value belonging to the set $\{a, b, g, h\}$ and how many have an amplitude value belonging to the set $\{c, d, e, f\}$. Depending on these numbers, one book is chosen from 2 possible coding books. In the embodiment shown, the same 16 DPCM-samples in accordance with the code book selected are now converted into VLC-samples. Thus, these 16 DPCM-samples now form also the previously mentioned signal segment.

As has been described in the foregoing, a DPCM-sample cannot be encoded until it is known which code book is to be used. Since in the embodiment considered here, the 16 DPCM-samples of the signal segment also constitute, the reference set, these 16 DPCM-samples cannot be encoded until the last one of these 16 DPCM-samples has been received. For that reason, these 16 DPCM-samples are applied in this embodiment, with the object of being temporarily buffered, to a memory 2.1 which has a capacity for storing 16 DPCM-samples x(n) and a time delay corresponding to 16 sampling periods. To determine the coding book, these 16 DPCM-samples are also applied to an adaptation circuit 2.14. In the embodiment shown this adaptation circuit includes a first comparator circuit 2.2 which at its output supplies a logic value "1" each time the relevant DPCM-sample has an amplitude value associated with the set {a, b, g, h} and supplies a logic value "0" each time the relevant DPCM-sample has an amplitude value belonging to the set {c, d, e, f}. These logic values are applied to an AND-gate 2.6, which also receives control pulses from a control circuit 2.5. From a clock pulse generator 2.4 this control circuit receives clock pulses which occur at a frequency of, for example, $f(m)=4*f(s)$. In response to these clock pulses the control circuit 2.5 applies a control pulse to AND-gate 2.6 via line 2.11, each time a new DPCM-sample has been applied to the comparator circuit 2.2. Depending on the fact whether this comparison circuit suppies a logic "1" or a logic "0", this control pulse is applied or not applied to a counter circuit 2.3, in response to which its counter position is incremented or not incremented by one unit. Thus, the counter circuit 2.3 counts the DPCM-samples of the reference set which have an amplitude value belonging to the set {a, b, g, h}. Each time the comparator circuit 2.2 has received a sequence of 16 consecutive DPCM-samples, the control circuit 2.5 applies a control pulse to a further AND-gate 2.7 via line 2.12. In response thereto, the actual counting position TS of counter circuit 2.3 is applied via this AND-gate 2.7 to a second comparator circuit 2.8 which supplies a code book signal CS. Thereafter the control circuit 2.5 supplies a further control pulse via line 2.13 which resets the counter circuit 2.3, as a result of which this circuit is enabled for counting the DPCM-samples having an amplitude value belonging to the set {a, b, g, h} of the subsequent group of 16 consecutive DPCM-samples.

In comparator circuit 2.8 the counting position TS is compared with a threshold value. If TS is less than or equal to this threshold value then the coding book signal CS is equal to the logic value "0". If TS exceeds this threshold value, then CS becomes equal to the logic value "1". Typically, in this embodiment, the threshold value is chosen to be equal to 8. The coder book signal CS, which is also the output signal of adaptation circuit 2.14, is applied by way of address to a memory 2.9 and addresses one of, in the present case, two coder books stored therein. At the subsequent 16 sampling pulses the 16 DPCM-samples x(n) in memory 2.1 are applied one-by-one as address to the memory 2.9, which as a result thereof always supplies one code word c(n) from the addressed coder book. The code words thus obtained and the coder book signal CS are further applied to a multiplexer 2.10 which each time applies the coder book signal CS followed by the associated 16 code words c(n) to the buffer 1.4. As has already been stated, the coder book signal CS and the code words c(n) are temporarily stored in the buffer 1.4 to enable their transmission to the receiver at a constant bit rate.

Figures 3, 4, 4A, 4B:
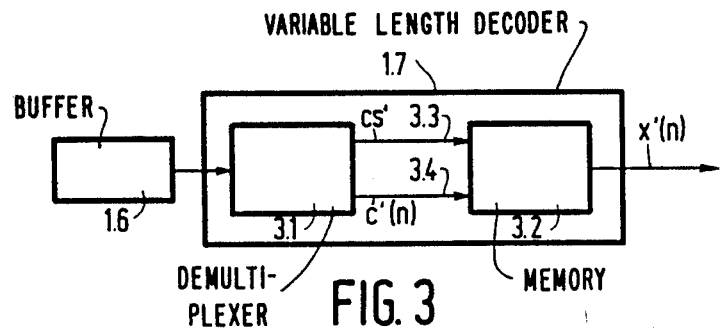
FIG. 3 shows an emboidment of a variable-length decoder circuit.
FIGS. 4a and 4b show an example of two possible coding books.

In the receiver 1.11 a received decoder book signal CS' and received code words c'(n) are temporarily stored in the buffer 1.5; see FIG. 1. Then first the decoder book signal CS' and thereafter, in the rhythm of the sampling rate, the code words c'(n) are applied to the variable-length decoder device 1.7, an embodiment of which is shown in FIG. 3. In this embodiment, the decoder device 1.7 includes a demultiplexer 3.1, which separates the decoder book signal CS' from the code words c'(n). The decoder book signal CS' is applied as address to a memory 3.2, for example a ROM, via a line 3.3, whereas the subsequent code words c'(n) are also applied one-by-one as address to this memory in the rhythm of the sampling rate via a line 3.4. This memory 3.2 contains 2 decoder books, that is to say twice 8 memory locations which each contain a fixed-length DPCM-sample and can each be addressed by a VLC-sample. The received decoder book signal CS' selects the desired decoder book. Now there appear at the output of memory 3.2 in the rhythm of the sampling rate, the DPCM-samples x(n) of a fixed length which are applied to the inverse DPCM-circuit 1.8, as is illustrated in FIG. 1.

For the sake of completeness, FIG. 4 shows by way of illustration two possiblecoder books and the two decoder books corresponding therewith. FIG. 4a shows in column I the 8 possible amplitude values of the DPCM-samples (numbered a to h, inclusive here). Column II shows a first sequence of variable-length code words which form a first coder book. A self-synchronizing code is chosen here which is characterized in that each 1-0 or 0-1 transition marks the end of a code word, which in practice is advantageous for the implementation of the decoder. Column III shows a second sequence of variable-length code words which form a second coder book. The set of code words of this second coder book is chosen here as a permutation of the set of code words of the first coder book shown in column I. This results in the code words of this second coder book having the same synchronizing properties as those of the first coder book. These coder books are stored in memory 2.9. FIG. 4b shows in column I the 8 possible variable-length code words. Column II shows a first sequence of amplitude values of DPCM-samples which form a first decoder book which corresponds to the first coder book shown in column II of FIG. 4a. Column III shows a second sequence of amplitude values of DPCM-samples which form a second decoder book which corresponds to the second coder book shown in column III of FIG. 4a. These decoder books are stored in the memory 3.2.

The first coder book (and consequently also the first decoder book) is selected when, seen locally, the centremost amplitude values occur more often than the outermost amplitude values. The second coder book (and consequently also the second decoder book) is selected when locally the outermost amplitude values occur more often than the centremost values. Since now the amplitude values most occurring are assigned "short" code words and "long" code words are applied to the amplitude values of a lesser occurrence, an efficient bit rate reduction is realized.

In the embodiment shown in FIG. 2 is it assumed that the memory 2.9 contains two coder books. It is however highly possible to store more than two coder books in this memory. This is advisable when the set of all possible amplitude values of DPCM-samples is divided into more than two sub-sets. In that case the first comparator circuit can be arranged to determine the amplitude-value distribution of the reference words (here DPCM-samples) of the reference set over these fixed subsets. The counter circuit 2.3 is then arranged such that for each subset it indicates how many DPCM-samples of the reference set have a corresponding amplitude value. After each reference set these data are applied to the second comparator circuit which can then be structured such that they can determined on the basis of a plurality of threshold values which coding book is to be selected.

In the embodiment shown in FIG. 2, the reference set is formed by the same samples as those from which the signal segment to be encoded consists. It is however alternatively possible to choose the reference set differently with respect to the signal segment. If for each signal segment the associated reference set is formed from samples which all precede the signal segment to be encoded, then no information about the coder book to be used needs to be transmitted to the variable-length decoder circuit in the receiver.

Figure 5:
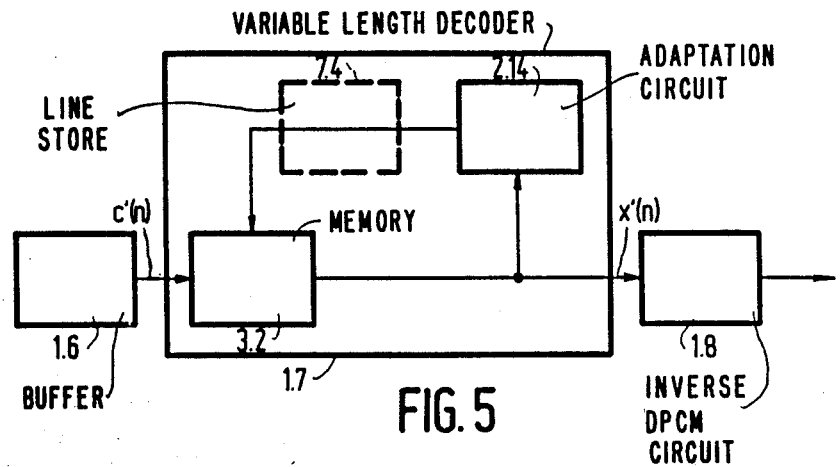
FIG. 5 shows another embodiment of a variable-length decoder circuit.

If, for example, for each signal segment of 16 DPCM-samples to be encoded the associated reference set would consist of the signal segment preceding this signal segment, then the DPCM-samples x(n) need not to be delayed before they can be encoded. This implies that in the embodiment shown in FIG. 2 the memory 2.1 can be omitted. Namely, in that case, the second comparator circuit 2.8 will already have determined a coder book signal CS for the actual signal segment on the basis of the amplitude value distribution within the preceding signal segment, and each DPCM-sample can be directly applied to the memory 2.9. Furthermore, CS then needs not to be transmitted to the receiver, but it will be possible to recover it there from the received code words. A receiver arranged for that purpose is shown in FIG. 5. The variable-length decoder circuit 1.7 is predominantly of the same structure as the variable-length coder circuit shown in FIG. 2, but differs from said circuit in that the output signal of the memory 3.2 is applied to the adaptation circuit 2.14, which may here be of the same structure as the adaptation circuit 2.14 shown in FIG. 2. It produces a decoder book signal CS', which is applied to the memory 3.2 for decoding the subsequent first code words c'(n).

In the embodiment of FIG. 2 it is assumed that the signal segment to be encoded, coincides with the reference set. In the embodiment of FIG. 5 it is assumed that the reference set is formed by 16 DPCM-samples which immediately precede the signal segment to be encoded.

Figure 6:
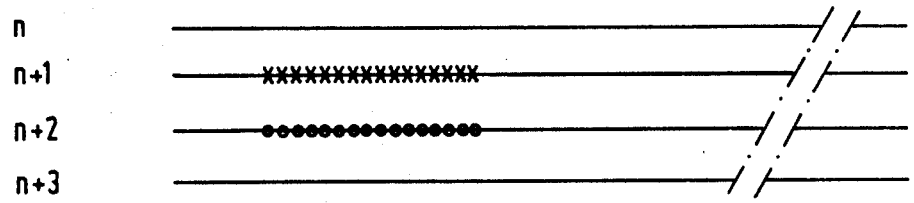
FIG. 6 shows a possible location of the reference set relative to a signal segment.

FIG. 6 shows another location of the reference set relative to the associated signal segment to be encoded. More specifically, this Figure shows four consecutive picture lines of a video field or video picture, numbered n to n+3, inclusive. On the line n+2, 16 picture elements are represented by dots, the corresponding DPCM-samples of which represent the signal segment to be encoded. The picture elements, corresponding to these picture elements, of the preceding line n+1 are denoted by crosses. The DPCM-samples corresponding to said last picture elements represent the reference set.

Figure 7:
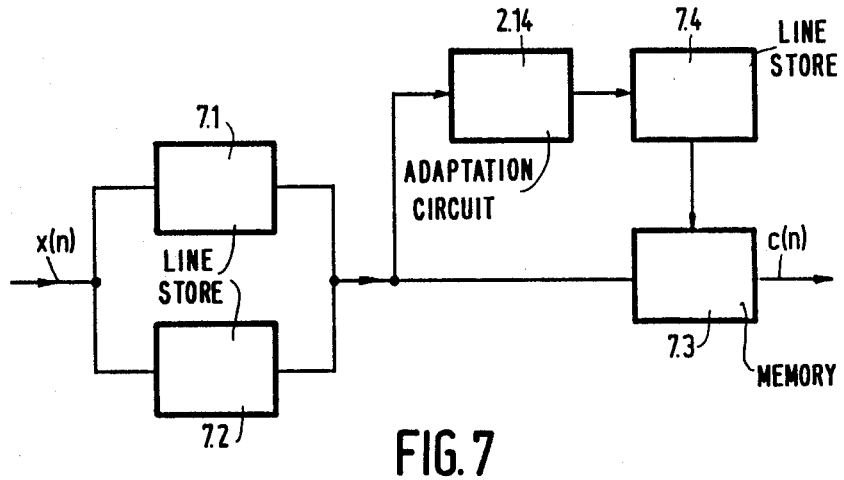
FIG. 7 shows a further embodiment of a variable-length encoding circuit.

FIG. 7 shows an embodiment of a variable-length coder circuit wherein the relation between the reference set and the signal segment to be encoded shown in FIG. 6 is valid. This embodiment predominantly corresponds to the embodiment shown in FIG. 2 but differs therefrom in that from the incoming DPCM-samples x(n) consecutive sequences, each corresponding to a picture line, are alternately applied to one of two line stores 7.1 and 7.2. While one line memory is filled with DPCM-samples, the content of the other line memory is applied to the memory 7.3 and also to the adaptation circuit 2.14, whose structure is shown in FIG. 2. For the sake of simplicity, let it be assumed that a picture line contains 720 DPCM-samples. This implies that, if the reference set is formed by 16 reference words, 45 coder book signals CS are generated in each picture line. These signals are sequentially applied to a store 7.4, where they are delayed by one line period. If then the content of the subsequent picture line is applied to the memory 7.3, the 45 coder book signals CS associated with the relevant 45 reference sets address the associated coder book for each of the 45 signal segments of the new line. In this embodiment it is not necessary to transmit the information about the selected coder books to the receiver. This receiver may predominantly be of the same structure as the receiver shown in FIG. 5, provided however that, as was also the case for the transmitter shown in FIG. 7, a further memory for storing the 45 decoder book signals CS' generated by picture line is to be included between the adaptation circuit 2.14 and the memory 3.2. This further memory is shown in FIG. 5 by means of the broken-line block 7.4.

It should here be noted that the signal segments and the reference sets which in the embodiments described here each comprise 16 DPCM-samples, may alternatively contain different numbers of samples (which may optionally be mutually different).

Finally it should be noted that in the transmitter, instead of DPCM-samples, video signal samples can alternatively be applied to the adaptation circuit as the reference set is not of necessity formed from DPCM-samples. If the coder book signals generated in the transmitter are not transmitted from the transmitter to the receiver it is alternatively possible to apply the output samples of the DPCM-coder to the adaptation circuit with the object of generating the decoder book signals there.

I claim:

1. A system for the transmission of a video signal from a transmitter to a receiver in a digitized form obtained by means of differential pulse code modulation (DPCM), the transmitter including a differential pulse code modulator which produces an output signal consisting of signal words, the signal words additionally being submitted in a variable-length encoding circuit to a variable-length coding operation, to generate variable-length code words, and the receiver including a variable-length decoder circuit to convert the received variable-length code words into signal words of a fixed length which are in addition applied to a differential pulse code demodulator, characterized in that the variable-length encoding circuit in the transmitter comprises:

means for defining contiguous signal segments, each consisting of a sequence of consecutive signal words, means for defining for each signal segment a reference set consisting of a number of reference words which are related to a number of signal words which are predetermined relative to the signal segment and are correlated with the signal words of the signal segment;

means for determining a statistical quantity from the reference set thus formed and for generating a coding book signal under the control thereof;

means for selecting under the control of said codingg book signal a coding book from a fixed set of coding books;

means for converting for each signal segment the signal words in accordance with the selected code book into variable-length code words; and that the variable-length decoder circuit in the receiver comprises:

means for generating for each received signal segment a decoder book signal from the received signal which corresponds to the coding book signal generated in the transmitter for the relevant signal segment;

means for selecting a decoder book from a fixed set of decoder books under the control of said decoder book signal;

means for converting for each received signal segment the variable-length code words in accordance with the selected decoder book into signal words.

2. A transmitter for the transmission of a video signal in a digitized form comprising a differential pulse code modulator which produces an output signal formed by signal words, the signal words additionally being submitted in a variable-length coder circuit to a variable-length coding operation, for generating variable-length code words, characterized in that the variable-length coder circuit in the transmitter comprises:

means for defining contiguous signal segments, each consisting of a sequence of consecutive signal words, means for defining for each signal segment a reference set consisting of a number of reference words which are related to a number of signal words which are predetermined relative to the signal segment and are correlated with the signal words of the signal segment;

means for determining a statistical quantity from the reference set thus formed and for generating a coding book signal under the control thereof;

means for selecting under the control of said coding book signal a coding book from a fixed set of coding books;

means for converting for each signal segment the signal words in accordance with the selected code book into variable-length code words.

3. A transmitter as claimed in claim 2, characterized in that said coding books are different permutations of one and the same set of variable-length code words.

4. A transmitter as claimed in claim 2 or 3, characterized in that said statistical quantity consists of a group of numerals each indicating how many reference words of the reference set considered belong to a given sub-set of the set of all possible magnitudes of the reference words.

5. A transmitter as claimed in claim 2 or, characterized in that for each signal segment the associated reference set is exclusively formed of reference words which are not signal words of the signal segment and are not related to the signal words of the signal segment.

6. A transmitter as claimed in claim 2 or 3, characterized in that the variable-length coder circuit in the transmitter includes: a multiplexer which applies in multiplex the generated variable-length code words and the generated coder book signal to the receiver.

7. A transmitter as claimed in claim 4, characterized in that for each signal segment, the associated reference set is exclusively formed of reference words which are not signal words of the signal segment and are not related to the signal words of the signal segment.

8. A transmitter as claimed in claim 4, characterized in that the variable-length coder circuit in the transmitter includes: a multiplexer which applies, in multiplex, the generated variable-length code words and the generated coder book signal to the receiver.

9. A receiver for the reception of a video signal transmitted in a digitized form by differential pulse code modulation forming signal words which are additionally submitted to a variable-length encoding operation thereby generating variable-length code words, said receiver comprising a variable-length decoder circuit for converting the received variable-length code words into signal words of a fixed length which are additionally applied to a differential pulse code demodulator, characterized in that the variable-length decoder circuit in the receiver comprises:

means for generating for each received signal segment a decoder book signal from the received signal which corresponds to the coder book signal generated in the transmitter for the relevant signal segment;

means for selecting a decoder book from a fixed set of decoder books under the control of said coder book signal;

means for converting for each received signal segment the variable-length code words into signal words, in accordance with the selected decoder book.

10. A receiver as claimed in claim 9, characterized in that said decoder books are different permutations of one and the same set of fixed-length signal words.

11. A receiver as claimed in claim 9 or 10, characterized in that said means for generating for each signal segment received a decoder book signal from the received signals comprise:

means for defining for each signal segment a reference set consisting of a number of reference words which are related to a number of signal words which are predetermined relative to the signal segment and are correlated with the signal words of the signal segment;

means for determining a statistical quantity from the reference set thus formed.

12. A receiver as claimed in claim 9 or 10, wherein the generated variable-length code words and the generated coder book signals are transmitted in multiplex, characterized in that said means for generating for each received signal segment a decoder book signal from the received signals include: a demultiplexer which separates said decoder book signal from the received variable-length code words.

* * * * *